April 24, 1945.　　　M. M. FARRAND　　　2,374,341
DISPLAY DEVICE
Filed Dec. 10, 1943　　　2 Sheets-Sheet 1

Inventor
MAUD M. FARRAND

By Clarence A. O'Brien
and Harvey B. Jacobson
Attorneys

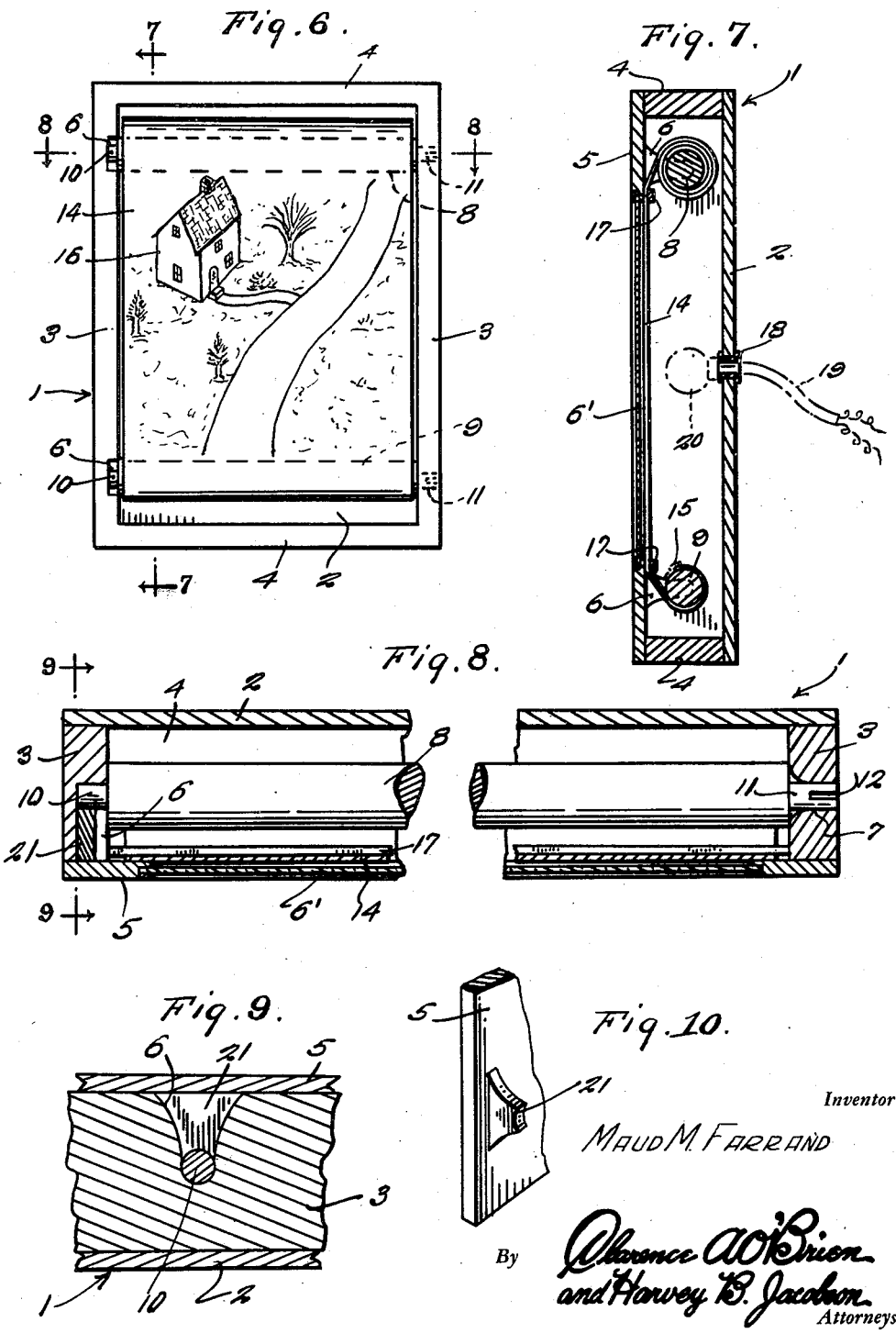

Patented Apr. 24, 1945

2,374,341

UNITED STATES PATENT OFFICE 2,374,341

DISPLAY DEVICE

Maud M. Farrand, Marshall, Ark.

Application December 10, 1943, Serial No. 513,777

1 Claim. (Cl. 35—76)

The present invention relates to new and useful improvements in display devices of the double reel and web type for use particularly by children, and has for its primary object to provide, in a manner as hereinafter set forth, novel means for teaching stories, et cetera, through the medium of a series of pictures on a strip or web of suitable flexible material.

Other objects of the invention are to provide a display device of the aforementioned character which will be comparatively simple in construction, strong, durable, compact, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 6 is a top plan view of the device with the cover removed.

Figure 7 is a view in longitudinal section, taken substantially on the line 7—7 of Figure 6.

Figure 8 is a cross sectional view, taken substantially on the line 8—8 of Figure 6.

Figure 9 is a fragmentary view in vertical section, taken substantially on the line 9—9 of Figure 8.

Figure 10 is a bottom perspective view of a corner portion of the cover.

Figure 1:
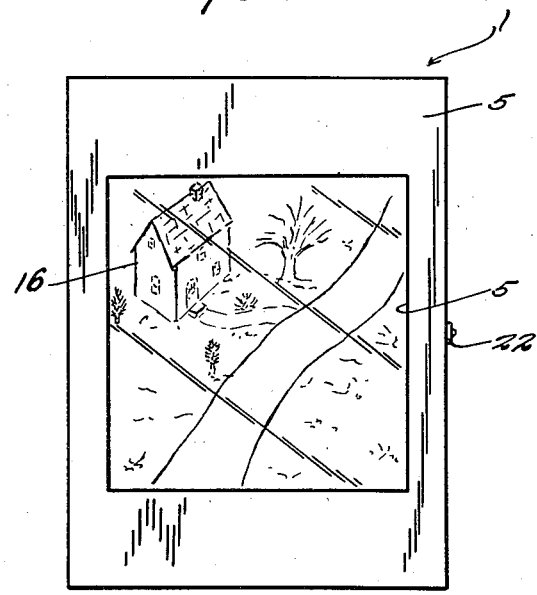
Figure 1 is a top plan view of a display device constructed in accordance with the present invention.
Figure 2:
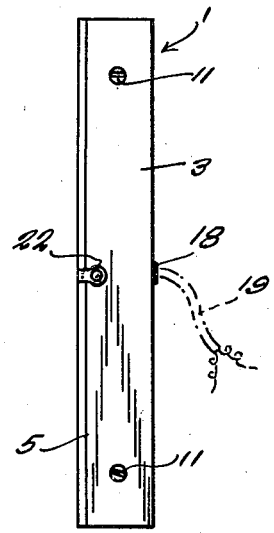
Figure 2 is an elevational view, looking at one side of the device.
Figure 3:
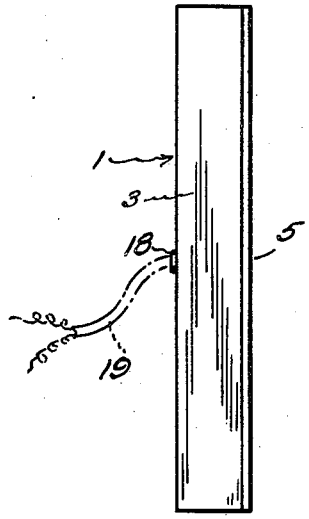
Figure 3 is an elevational view, looking at the opposite side of the device.
Figure 4:
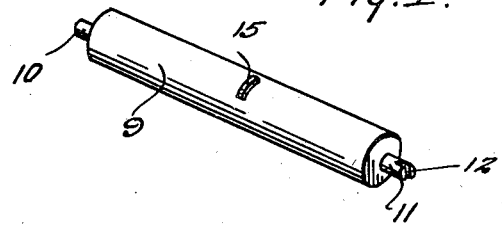
Figure 4 is a perspective view of one of the spools.
Figure 5:
Figure 5 is a detail view in perspective of the operating key.

Referring now to the drawings in detail, it will be seen that the embodiment of the invention which has been illustrated comprises a substantially rectangular case of suitable dimensions and material which is designated generally by reference numeral 1. The case 1 includes a bottom 2, sides 3, ends 4 and a cover 5, said cover 5 having a window 6' therein.

One of the side walls 3 has formed in its inner face, adjacent its ends, recesses or pockets 6 which extend downwardly thereinto from the upper edge thereof. The other side wall 3 of the case 1 has formed therein openings 7 which are transversely aligned with the recesses 6.

Removable spools 8 and 9 are mounted transversely in the end portions of the case 1. The recesses 6 constitute bearings in which trunnions 10 on one end of the spools 8 and 9 are journaled. The openings 7 constitute bearings for the reception of trunnions 11 on the other ends of the spools 8 and 9. The trunnions 11 have formed therein slots 12 for the reception of a turning key 13.

A web 14 of suitable material is carried by the spool 8. The web 14 is connected at one end, as at 15, to the empty spool 9 for winding thereon. In the embodiment shown, the web 14 is provided with a series of pictures 16 to be viewed through the window 6'. Transverse guides 17 in the upper portion of the case 1 support the web 14 adjacent the window 6'. An insulated opening 18 is provided in the bottom 2 of the case 1. The opening 18 accommodates a conductor cord 19 to an electric lamp 20 in the case 1 if it is desired to illuminate the pictures on the web 14.

Depending bearings 21 are provided on one of the longitudinal marginal portions of the cover 5 for engagement in the recesses 6 for retaining the trunnions 10 in position therein. The bearings 21 also provide means for assisting in retaining the cover 5 in position on the case 1. A suitable securing latch 22 is provided on the other side portion of the cover 8 for connection with the corresponding side wall of the case 1.

It is thought that the operation of the device will be readily apparent from a consideration of the foregoing. Briefly, the case 1 is opened to permit the mounting therein of the spools 8 and 9, the former having wound thereon the web 14. The web 14 is carried across the guides 17 and connected at 15 to the spool 9, after which the case 1 is closed. Through the medium of the key 13, the spool 9 is turned to wind the web 14 thereon from the spool 8. Thus, the pictures 16 may be successively viewed in an attractive, impressive manner through the window 6'. When the web 14 has been exhausted, it may be rewound on the spool 8 by connecting the key 13 to said spool. The construction and arrangement is such that the spools 8 and 9 may be expeditiously inserted and removed.

It is believed that the many advantages of a display device constructed in accordance with the present invention will be readily understood, and although a preferred embodiment of said device is as illustrated and described, it is to be understood that changes in the details of construction and in the combination and arrangement of parts may be resorted to which will fall within the scope of the invention as claimed.

What is claimed is:

In a display device of the character described, a substantially rectangular case including a bottom, sides, ends and a removable flat cover, one of said sides having, in its inner face, recesses extending downwardly thereinto from the upper edge thereof, the other of said sides having openings therein, a pair of spools removably mounted in the case and including trunnions on their ends journaled in the recesses and the openings, and bearings depending from the cover adjacent but inwardly of one side edge thereof and engaged in the recesses for retaining the respective trunnions therein.

MAUD M. FARRAND.